United States Patent
Bauer et al.

(10) Patent No.: US 6,746,653 B2
(45) Date of Patent: Jun. 8, 2004

(54) PROCESS FOR RECOVERING CATALYST TRANSITION METALS FROM SALT-CONTAINING REACTION MIXTURES

(75) Inventors: Frank Bauer, Haltern (DE); Uwe Prange, Niederkassel (DE); Christoph Theis, Niederkassel (DE)

(73) Assignee: Degussa AG, Duesseldorf (DE)

( * ) Notice: Subject to any disclaimer, the term of this patent is extended or adjusted under 35 U.S.C. 154(b) by 253 days.

(21) Appl. No.: 09/788,559

(22) Filed: Feb. 21, 2001

(65) Prior Publication Data

US 2001/0017065 A1 Aug. 30, 2001

(30) Foreign Application Priority Data

Feb. 25, 2000 (DE) .......................... 100 08 904

(51) Int. Cl.⁷ ................................................ C22B 23/00
(52) U.S. Cl. .................. 423/22; 423/138; 423/139; 423/148; 423/417; 423/594.19; 502/38
(58) Field of Search .................. 423/22, 138, 148, 423/417, 139, 594.19; 502/38; 23/303, 299, 302 R, 304

(56) References Cited

U.S. PATENT DOCUMENTS

| 3,920,449 A | 11/1975 | Onoda et al. | |
|---|---|---|---|
| 4,234,545 A | * 11/1980 | El-Chahawi et al. | ........ 423/138 |
| 4,292,448 A | 9/1981 | Tsunoda et al. | |
| 4,308,240 A | * 12/1981 | Harper et al. | ................ 423/150 |
| 4,410,449 A | * 10/1983 | Diessel et al. | ................. 502/24 |
| 5,302,183 A | * 4/1994 | De Boer et al. | ............... 423/22 |
| 5,585,077 A | 12/1996 | Evans et al. | |
| 5,776,848 A | 7/1998 | Evans et al. | |

FOREIGN PATENT DOCUMENTS

| DD | 299375 | * 4/1992 |
|---|---|---|
| JP | 53112808 | 10/1978 |
| JP | 57014557 | 1/1982 |
| JP | 60-33376 | 8/1985 |

OTHER PUBLICATIONS

Kirk Othmer Encyclopedia of Chemical Technology, Fourth Edition, vol. 6; "Chlorocarbons and chlorohydrocarbons–$C_2$ to Combustion Technology"; pp. 781, no date.

* cited by examiner

Primary Examiner—Steven Bos
(74) Attorney, Agent, or Firm—Oblon, Spivak, McClelland, Maier & Neustadt, P.C.

(57) ABSTRACT

Transition metals may be recovered from a salt-containing mixture containing at least one transition metal compound, salts, and organic compounds by separating from the salt-containing mixture a mixture of the transition metal compound and the salts. This mixture, together with any organic impurities, is introduced into a combustion zone, and the flue gas/salt mixture leaving the combustion zone is quenched with water. The combustion residue, containing the transition metal, is separated from the resulting quench solution, dried, and converted to fresh catalyst.

26 Claims, No Drawings

PROCESS FOR RECOVERING CATALYST TRANSITION METALS FROM SALT-CONTAINING REACTION MIXTURES

The priority document of the present application, German patent application 10008904.6, filed Feb. 25, 2000, is incorporated herein by reference.

BACKGROUND OF THE INVENTION

1. Field of the Invention

The present invention is a process for recovering transition metals from catalysts, in particular cobalt, from salt-containing reaction mixtures, and the conversion of the recovered metals into new catalysts.

2. Discussion of the Background

Many chemical reactions produce reaction mixtures composed of the desired product, as well as by products such as salts or salt-like materials in addition to the catalyst or catalysts used, and the decomposition products of these catalysts. For example, halogen-substituted compounds may be carbonylated in the presence of catalyst compounds based on transition metals of Group VIII of the Periodic Table of the Elements. Such metals include, for example, ruthenium, platinum and palladium salts or complexes, as well as cobalt compounds. Carbonylation reactions often employ cobalt carbonyl complexes and species which can be generated therefrom, e.g., alkali metal salts, particularly sodium salts of hydridocobalt carbonyls. These carbonylation reactions are usually carried out in the presence of a base, so that a mixture of the carbonylation product, any solvent used, dissolved carbon monoxide, catalyst and/or decomposition products of the catalyst, salts formed during the reaction, and other components, are obtained upon completion of the reaction.

Generally, reactions are "worked up" (i.e., products isolated and purified) with the intention of isolating the product in as high yield as is possible. However, implementing such processes on an industrial scale requires additional considerations. In addition to simply recovering the solvents used, it is also desirable to employ processes which allow virtually quantitative recovery of the catalyst, or its decomposition products, in a form which permits simple conversion of the recovered catalyst or catalyst decomposition products into new catalyst. Furthermore, for both economic and environmental reasons, any salts ("salts" includes a salt, or a mixture of salts) present in the reaction mixture should be recovered in a form which allows them to be used in other processes. For example, the recovered salts should not contain contaminants which would interfere with any other processes in which they may be used (e.g., a chloralkali electrolysis process).

Thus, for example, a simple work-up method for salt-containing reaction mixtures containing a cobalt catalyst is to mix the reaction mixture with aqueous acid, either by adding the reaction mixture to the aqueous acid, or the converse. The salt and the cobalt compounds would thereby tend to dissolve in the aqueous acid phase, and the product, together with any solvents present in the reaction mixture, would tend to form a separate organic phase. The aqueous acid phase containing the dissolved catalysts and the salts may then be separated more readily from the organic phase containing the desired product. After the addition of a suitable precipitating agent, the cobalt may then be precipitated and separated from the aqueous phase as water-insoluble cobalt compounds, for example as cobalt hydroxide.

The above-mentioned procedure has been described for the carbonylation of haloacetic esters with carbon monoxide, and their subsequent reaction with an alcohol and a base in the presence of a cobalt carbonyl complex catalyst (JP 60 033 376). Although the cobalt separated off in this manner can be converted, after washing and drying, into fresh cobalt carbonyl complex catalyst, the cobalt recovery process first requires acidification, and then gasification of the reaction mixture. Accordingly, this process consumes large amounts of reagents.

The above procedure may also be used to prepare diesters of malonic acid, which are versatile synthetic building blocks in organic chemistry used, for example, as intermediates in the synthesis of pharmaceuticals, crop protection agents, fragrances, flavors, dyes and plastics. However, the carbonylation procedure described above also requires an excess of alcohol in order to obtain high product yields. In the preparation of short chain malonic diesters, the excess alcohol is usually dissolved mostly in the aqueous phase. Even though the alcohol may be recovered by distillation, it is difficult to recover the salt or salt mixtures in a form which allows them to be used in other processes. The salt solution remaining after separation of the alcohol contains not only the desired product, but also small amounts of dissolved transition metals such as cobalt, as well as other water-soluble impurities such as saponification and condensation products.

It has been found that the desired product may be isolated by extraction from the reaction mixture with sparingly water-soluble or water-insoluble solvents and, for example, the residual dissolved cobalt may be separated from the mixture using suitable ion-exchange materials, preferably a selective chelating ion-exchange material such as TP 207 from Bayer AG. However, evaporation of the solvent and/or water from the remaining salt solution provides salts whose organic impurity content, for example 3% by weight, does not in practice allow the salts to be used in other processes. Improved salt purity was not obtained, regardless of the pH chosen for the activated carbon treatment, even after treating the remaining salt solution with activated carbon before evaporation of the solvents and/or water. In particular, the purity of sodium chloride obtained by the above process is unsuitable for many applications, for example, for use in chloralkali electrolysis.

In some cases, fractional crystallization of the salts dissolved in the aqueous phase provided salts of sufficient purity to be used in other processes. However, at industrially acceptable degrees of evaporation of greater than 75%, salt fractions having a relatively high proportion of organic impurities of approximately 3% by weight are typically produced.

Instead of separating the transition metal and the salt or salt mixture present in the reaction mixture from the other components of the reaction by dissolving them in water, it is also possible to separate the transition metal and salts from the reaction mixture by filtration. In some cases, this requires pretreatment of the reaction mixture. Thus, for example, cobalt carbonyl complexes can be oxidized by air oxidation, and thereby converted into cobalt compounds which are insoluble in the reaction mixture (JP 57 014 557). These insoluble cobalt compounds may then be filtered out of the reaction mixture.

However, it has been found that a mixture of salts and transition metal compounds which has been separated from the reaction mixture by filtration is also not sufficiently free of organic impurities to be used in other processes. Even after being washed multiple times with organic solvents, dissolved in water or aqueous acid, thereby completely removing the transition metal, and subsequent evaporating the residue to dryness, salts were obtained with organic impurity levels of typically 3% by weight. Again, the purity of the salt was not improved, even after treating the salt solution with activated carbon and subsequently evaporating the water and solvents, regardless of the pH chosen for the activated carbon treatment. Only at low levels of evaporation did an evaporative crystallization process provide salts with an organic impurity level below 0.5% by weight.

It is therefore an object of the present invention to develop a generally applicable process for recovering a catalyst metal from a reaction mixture, so that the catalyst metal may be isolated in a form which allows it to be readily recirculated to the synthesis process, for example by converting the recovered catalyst to fresh catalyst. Furthermore, the recovery process of the present invention makes it possible to isolate, in pure form, any salt present in the reaction mixture, so that it can be used in other processes.

SUMMARY OF THE INVENTION

Surprisingly, the above-mentioned disadvantages can be avoided by introducing the salts present in the reaction mixture, together with the transition metal compounds present in the reaction mixture, into a combustion zone. If desired, the mixture may be pretreated with air or by the addition of a base. The flue gas/salt mixture leaving the combustion zone may also, if desired, be cooled by appropriate methods in order to recover the heat from the combustion zone. The flue gas/salt mixture is then subsequently quenched with water.

DETAILED DESCRIPTION OF THE INVENTION

Using this process, transition metals selected from the group consisting of ruthenium, platinum, palladium and cobalt may be recovered from reactions catalyzed by transition metals, and containing salts. In this process, the transition metal compounds and salts, together with organic impurities, are separated from the reaction mixture and introduced into a combustion zone. The flue gas/salt mixture leaving the combustion zone is then quenched with water, and the combustion residue containing the transition metal is separated from the resulting quench solution, dried, and reused as a starting material for producing fresh catalyst.

The mixture of salts and, if the mixture has been pretreated with air or the addition of base, the insoluble transition metal compounds, may be separated from the reaction mixture by a variety of methods, for example by filtration or decantation. When the resulting solids are removed from the mixture by such methods, it has been found to be advantageous to wash the solids with one or more solvents, preferably those already present in the reaction mixture, and/or water. Preferably, organic solvents which are immiscible or only sparingly miscible with water, e.g. aliphatic, cycloaliphatic or substituted or unsubstituted aromatic hydrocarbons, ethers or the like, are used. For example, such solvents may be toluene and methyl tert-butyl ether. The washing solvents are substantially removed from the solid mixture before it is introduced into the combustion zone.

It is particularly advantageous to remove substantially all of the volatile components from the reaction mixture using mild distillation conditions, preferably distillation with a thin film evaporator or thin film drier/evaporator. The remaining mixture of salts and the transition metal catalyst and/or its decomposition products can then be fed, preferably continuously, into a combustion zone according to the process of the invention.

The desired product and the solvents used can, of course, also be successively separated from the nonvolatile components of the reaction mixture. Regardless of the procedure used, if the distillation conditions are judiciously selected, the residue remaining after removal of the volatile components of the reaction mixture is usually obtained in the form of a dust-like solid which does not tend to form agglomerates. Such dust-like solid residues are therefore particularly preferably conveyed pneumatically into the combustion zone. Nitrogen, argon, or preferably air may be used as conveying gases.

Furthermore, it has been found that impurities are most effectively removed from the mixture of salts and the transition metal compounds only when the combustion zone is maintained at temperatures of from 500 to 2000° C., preferably from 800 to 1800° C., particularly preferably from 900 to 1600° C. Temperatures of 600, 700, 800, 900, 1000, 1100, 1200, 1300, 1400, 1500, 1600, 1700, 1800, and 1900° C., inclusive of all values and subranges therebetween, may also be used. The use of a molar excess of oxygen or air in the auxiliary burner in the combustion zone has also been found to be important. The excess of oxygen or air can be up to 3 times, preferably up to 2 times, the amount of fuel mixture in the combustion zone. The excess is calculated based on the stoichiometric amount of oxygen required to completely oxidize the fuel mixture in the auxiliary burner.

Transition metal compounds which can be treated by the above-mentioned process are, in particular, compounds of transition metals of Group VIII of the Periodic Table. For example, such metal compounds include ruthenium, platinum and palladium compounds and also cobalt compounds, particularly cobalt carbonyl complexes (for example dicobalt octacarbonyl) and species which can be generated therefrom, e.g. alkali metal salts, in particular sodium salts of hydridocobalt carbonyl.

To avoid unnecessary contamination, deionized water is preferably used as the quench water. However, the quench water may also be recycled from other unit operations, for example flue gas scrubbing (e.g., with Venturi scrubbers), wet electrofilters or scrubbing columns, before it is employed for dissolving the salts introduced into the combustion zone.

Surprisingly, the salt solution does not foul or completely block components of the process equipment amount even if the amount of water used for the quench step is the minimum amount required in order for the dissolved salt or salt mixture to be at its solubility limit.

Furthermore, the product obtained after quenching contains virtually quantitative amounts of the transition metal in an insoluble form. For example, the dissolved amount of cobalt was usually less than 100 ppm in the quench solution. However, transition metals such as cobalt are present in substantially undissolved form only under equilibrium conditions where the quench solution is at most slightly acidic. It is therefore important in the process of the present invention that the mixture of salt or salts and the transition metal compounds introduced into the combustion zone be essentially neutral or, preferably basic. Otherwise, this mixture should be treated with a suitable base or mixture of bases. In particular, suitable bases may be, for example, alkali metal and alkaline earth metal hydroxides and carbonates. A preferred base is sodium carbonate. The quench product may also be mixed with one or more suitable precipitating agents.

The liquid phase of the quench product may also be treated with an ion exchange material in order to recover any residual transition metal which remains dissolved. The ion exchange material may be any conventional cation exchange material, such as a homopolymer or copolymer of acrylic or methacrylic acid, polystyrene sulfonate, or fluorinated polymers an copolymers having carboxylate or sulfonate groups.

The process of the present invention is particularly suitable for mixtures salts and transition metal compounds which are already alkaline. Thus, for instance, in the carbonylation of alkyl haloacetates and subsequent reaction with alcohols, either by the soda process or the alkaline earth metal carbonate process (JP 53 112 808), it is necessary to use an excess of base in order to avoid decomposition of the catalytic cobalt carbonyl complex during the reaction, and thereby provide high yields. In this case, the process of the preset invention not only saves process steps, but also reduces the amount of reagent used compared to the procedure described in JP 60 033 376.

The process of the present invention may be carried out using a lined, uncooled combustion chamber. In this case, natural gas or fuel oil may be used as fuels in the auxiliary burner, and may produce, for example, a cobalt containing powder which can be converted to dicobalt octacarbonyl in quantitative yield under mild conditions.

However, a cooled combustion chamber is preferred, since contamination of the quench product, due to corrosion of the combustion chamber lining, is minimized. An uncooled precombustion chamber in combination with a cooled main combustion chamber is particularly preferred. The mixture of salts and transition metal compounds is then preferably metered in at the constriction between the pre-combustion chamber and the main combustion chamber.

The temperatures required for converting a mixture of, for example, cobalt compounds isolated from the quenched product into dicobalt octacarbonyl depends in large measure on the type of fuel used in the auxiliary burner. For example, hydrogen and mixtures of hydrogen and hydrocarbon-containing gases gave better results than did pure hydrocarbons alone, when used as fuels in the cooled main combustion chamber. Accordingly, hydrogen or hydrogen-containing gases are particularly preferred fuels for the auxiliary burner. However, natural gas and mixtures of fuels with natural gas, fuel oil and/or liquid hydrocarbons may also be used.

The undissolved transition metal compounds present in the quench product may be separated mechanically, for example by filtration, or preferably by decantation. When decantation is used, a flocculent may be added to the quench product. The flocculant may be any conventional cationic, anionic, or nonionic flocculant. Cationic flocculants include, for example, polyethyleneamine), poly(2-hydroxypropyl-1-N-methylammonium chloride), poly(2-hydroxypropyl-1-N-dimethylammonium chloride), poly(N-(dimethylaminomethyl)acrylamide), poly(2-vinylimidazolinum bisulfate), poly (diallyldimethylammonium chloride), neutralized or quaternized poly(N,N-dimethylaminoethyl methacrylate), and poly(N-(dimethylaminopropyl)methacrylamide). Anionic flocculants include, for example, poly(sodium or ammonium acrylate), poly(sodium or ammonium methacrylate), and poly(sodium styrenesulfonate). Nonionic flocculants include, for example, polyacrylamide, poly (ethylene oxide), and poly(vinylpyrrolidinone). Preferably, the flocculent is an anionic polyacrylate (i.e., polyacrylic or methacrylic acid homopolymers or copolymers). After washing the resulting transition metal-containing sludge with water, preferably deionized water, followed by drying, the pulverulent material obtained may be used as the starting material for preparing a new catalyst.

It is known that cobalt (II) oxide cannot be converted into dicobalt octacarbonyl under the customary reaction conditions, because it is thermodynamically stable at high temperatures (Kirk-Othmer, Encyclopedia of Chemical Technology, 4th Ed., Vol. 6, p. 781, J. Wiley and Sons Inc., 1993). It is therefore extremely surprising that, in view of the very high combustion zone temperatures described above, the mixture of cobalt compounds can be converted, virtually quantitatively, into dicobalt octacarbonyl by reaction with carbon monoxide and hydrogen under mild conditions. More surprisingly, when alkali metal carbonates or alkaline earth metal carbonates are present in the reaction mixture, and when the transition metal is cobalt, the process of the present invention provides as a main product a cobalt carbonate which is thermally unstable under the combustion conditions (it is known that cobalt carbonate can be converted into dicobalt octacarbonyl under mild reaction conditions). In addition, the process virtually quantitatively burns out the organic impurities.

It has been found that when the dicobalt octacarbonyl is generated at high temperatures in alcoholic media, for example 180° C., considerable amounts of undesirable by-products are formed, which makes it difficult to isolate the pure, desired product later in the process. A particular advantage of the present invention, therefore, is the fact that even very low reaction temperatures, for example 90° C., are sufficient to achieve virtually quantitative conversion of the cobalt species recovered by the process of the present invention into dicobalt octacarbonyl. This virtual quantitative conversion of the cobalt is observed even in cases in which contamination of the carbonyl solution with methanol (formed from carbon monoxide and hydrogen) should be avoided. Finally, it should be noted that low reaction temperatures for catalyst production mean lower capital costs for the pressure reactor when implementing the processes on an industrial scale.

Sufficiently mild drying conditions must be used in order to successfully and quantitatively convert a cobalt-containing solid obtained by filtration or decantation, for example, into dicobalt octacarbonyl. Thus, it has been found that when a cobalt containing sludge, which has been separated off by filtration or decantation and subsequently washed, is dried at temperatures above 180° C., it can no longer be converted quantitatively into dicobalt octacarbonyl under mild reaction conditions. For this reason, the preferred drying temperature is from 80 to 180° C., particularly from 100 to 130° C. In addition, a drying temperature of 90, 100, 110, 120, 130, 140, 150, 160, and 170° C., inclusive of all values and subranges therebetween may be used. Drying at a reduced pressure, for example an absolute pressure of 100 mbar, has been found to be advantageous in order to achieve acceptable drying times even at low drying temperatures.

The transition metal-containing sludge isolated according to the process of the present invention, or the dry material obtained after drying the sludge, have been found to be virtually free of organic impurities. When suitable conditions are chosen, the quenched product obtained in this manner has only traces of organic impurities. For example, a TOC (Total Organic Carbon) of 150 ppm was observed in the quenched product. For example, in the case of a cobalt containing sludge, it is possible to convert either the sludge or the dried sludge, not only into dicobalt octacarbonyl, but also into other cobalt compounds by dissolving the cobalt in acids. After removal of traces of dissolved transition metal using an ion exchanger, preferably a suitable selective ion exchanger such as TP 207 from Bayer AG, the salts isolated from the quenched product by evaporation or evaporative crystallization can be utilized in many processes.

The process of the present invention has been found to be particularly advantageous when the salt dissolved in the quench product is sodium chloride. Thus, sodium chloride, isolated according to the process of the present invention, can be used even in chloralkali electrolysis using the amalgam method without causing a drop in the overvoltage over the mercury, and thus causing undesirable hydrogen evolution.

Having generally described this invention, a further understanding can be obtained by reference to certain specific examples which are provided herein for purposes of illustration only, and are not intended to be limiting unless otherwise specified.

EXAMPLE 1

Recovery of Cobalt From a Reaction Mixture Generated by the Carbonylation of Methyl Chloroacetate (Comparative Example)

A mixture of methyl chloroacetate, methanol and excess sodium carbonate in the presence of 2 mol % of dicobalt octacarbonyl was converted in a loop reactor into dimethyl malonate under customary reaction conditions.

This reaction mixture was then first mixed with 20% by weight of toluene, and then air was bubbled into the solution for 5 hours, while maintaining the mixture at a temperature of 40° C. The solvents and the dimethyl malonate were subsequently distilled off completely under reduced pressure in a thin film evaporator (yield of dimethyl malonate after work-up of the distillate from the thin film evaporator: 90% of the theoretical amount, based on the amount of methyl chloroacetate used). The remaining pulverulent residue was dissolved in dilute hydrochloric acid (pH=3.0) and the cobalt was precipitated by addition of dilute aqueous sodium hydroxide (pH=12). The solution obtained after filtration was then mixed with 4% of activated carbon, based on the amount of dissolved sodium chloride, stirred for 2 hours at room temperature, filtered again, freed of remaining traces of cobalt by means of a TP 207 ion exchanger, and finally evaporated completely. The sodium chloride thus obtained an organic impurities content of about 3% by weight, and was unsuitable for chloralkali electrolysis by the amalgam method.

EXAMPLE 2

Recovery of Cobalt From a Reaction Mixture Generated by the Carbonylation of Methyl Chloroacetate (Comparative Example)

The procedure of Example 1 was repeated, but the reaction mixture was added to dilute hydrochloric acid so that the pH did not drop below 3.0, without first adding toluene and bubbling air through the solution. After separating off the organic phase, the aqueous phase was extracted four times with methyl tert-butyl ether (yield of dimethyl malonate after work-up of the organic phase: 90% of the theoretical amount, based on the amount of methyl chloroacetate used). The cobalt was precipitated by addition of dilute aqueous sodium hydroxide (pH=12). The solution obtained after filtration was then mixed with 4% of activated carbon, based on the amount of dissolved sodium chloride, stirred for 2 hours at room temperature, filtered again, freed of remaining traces of cobalt by means of TP 207 ion exchanger and finally evaporated completely. The sodium chloride obtained had a content of organic impurities of about 3% by weight and was unsuitable for chloralkali electrolysis by the amalgam method.

EXAMPLE 3

Recovery of Cobalt From a Reaction Mixture Generated by the Carbonylation of Methyl Chloroacetate (According to the Present Invention)

The procedure of Example 1 was repeated, but the pulverulent residue obtained from the thin film evaporator was pneumatically conveyed with air into a combustion zone. The salt was introduced at the constriction between a lined precombustion chamber and a cooled main combustion chamber. The oxidation of the organic impurities was carried out using a hydrogen/natural gas mixture as fuel for the auxiliary burner at about a three-fold excess of air. The temperature in the precombustion chamber was about 1600° C.

Quenching the oxidized residue with deionized water gave a suspension saturated with sodium chloride without, even after operation for a number of days, salt deposits being formed. After filtering off the solids, the sodium chloride solution obtained in this manner contained less than 100 ppm of cobalt. The TOC of the filtered salt solution (brine) was less than 150 ppm.

Subsequent removal of traces of dissolved cobalt using a TP 207 ion exchanger and complete evaporation to dryness or, alternatively, evaporative crystallization provided sodium chloride of sufficient quality for use in chloralkali electrolysis by the amalgam method.

The cobalt-containing sludge separated off by filtration was washed twice with deionized water and subsequently dried to constant weight at 100° C./100 mbar. Reaction of the resulting pulverulent dry material with hydrogen and carbon monoxide in methanol/toluene mixtures at a maximum reaction temperature of 95° C. gave dicobalt octacarbonyl in quantitative yield. The brown solution contained no solids.

If the washed, cobalt-containing sludge was dried at 200° C. (not according to the invention), complete conversion into dicobalt octacarbonyl was not achieved under the conditions described above. The carbonyl solutions contained undissolved solids.

What is claimed as new and is intended to be secured by Letters Patent is:

1. A process for recovering at least one transition metal compound from a salt-containing mixture, comprising:

separating a mixture comprising at least one transition metal compound and a least one salt from said salt-containing mixture by distillation, thereby obtaining a pulverulent residue;

conveying said pulverulent residue to a combustion zone maintained at a temperature of from 900 to 2000° C., thereby forming a flue gas/salt mixture;

quenching said flue gas/salt mixture with water, thereby forming a quench solution;

separating a combustion residue comprising said at least one transition metal compound from said quench solution; and drying said combustion residue at a temperature of from 80 to 180° C., wherein said salt-containing mixture comprises at least one transition metal compound, at least one salt, and at least one organic compound.

2. The process of claim 1, further comprising:

pretreating said salt-containing mixture thereby converting said at least one transition metal compound to an insoluble and/or nonvolatile transition metal compound prior to separating said mixture.

3. The process of claim 2, wherein said pretreating is contacting said salt-containing mixture with oxygen or an oxygen-containing gas mixture.

4. The process of claim 1, further comprising:

adding at least one basic substance to said salt-containing mixture.

5. The process of claim 1, wherein said salt-containing mixture is a reaction mixture.

6. The process of claim 5, wherein said distillation is carried out with a thin film evaporator or a thin film drier.

7. The process of claim 1, wherein the transition metal of said transition metal compound is at least one transition metal selected from the group consisting of ruthenium, platinum, palladium, and cobalt.

8. The process of claim 1, wherein said conveying is by pneumatic conveyance into the combustion zone.

9. The process of claim 1, wherein said combustion zone comprises a precombustion chamber and a main combustion chamber and said pulverulent residue is introduced at a constriction between said precombustion chamber and said main combustion chamber.

10. The process of claim 9, wherein said precombustion chamber is a lined combustion chamber and said main combustion chamber is a cooled combustion chamber.

11. The process of claim 1, wherein said combustion zone has at least one auxiliary burner fueled with a fuel selected from the group consisting of hydrogen, natural gas, hydrocarbon-containing gases, and mixtures thereof.

12. The process of claim 1, wherein said combustion zone has at least one auxiliary burner fueled with a fuel selected from the group consisting of fuel oil, liquid hydrocarbons, and mixtures thereof.

13. The process of claim 11, wherein the auxiliary burner is operated using a stoichiometric excess of oxygen relative to the amount of fuel used.

14. The process of claim 12, wherein the auxiliary burner is operated using a stoichiometric excess of oxygen relative to the amount of fuel used.

15. The process of claim 1, wherein said separating of said combustion residue from said quench solution is decantation or filtration.

16. The process of claim 1, further comprising:

treating said quench solution with at least one flocculant, then separating said flocculated combustion residue from said quench solution by decantation.

17. The process of claim 1, further comprising:

washing said separated combustion residue.

18. The process of claim 1, wherein said drying is carried out under reduced pressure.

19. The process of claim 1, father comprising:

treating said quench solution from which said combustion residue has been removed with at least one ion exchanger.

20. The process of claim 19, further comprising:

evaporating water from said ion exchange treated solution.

21. The process of claim 20, further comprising:

separating at least one salt present in said ion exchange treated solution by evaporative crystallization.

22. The process of claim 1, wherein said at least one salt is sodium chloride.

23. The process of claim 1, wherein said at least one transition metal compound is a cobalt compound.

24. The process of claim 23, further comprising:

converting said combustion residue into dicobalt octacarbonyl or cobalt compounds.

25. The process of claim 1, further comprising:

converting said combustion residue into a catalyst.

26. The process of claim 1, wherein said salt-containing mixture further comprises alkali metal carbonates or alkaline earth metal carbonates and the transition metal of said transition metal compound is cobalt.

* * * * *